(12) United States Patent
Takahashi et al.

(10) Patent No.: US 10,739,367 B2
(45) Date of Patent: Aug. 11, 2020

(54) ON-VEHICLE IMAGE RECORDING APPARATUS, ON-VEHICLE IMAGE RECORDING METHOD, AND ON-VEHICLE IMAGE RECORDING PROGRAM

(71) Applicant: JVC KENWOOD Corporation, Yokohama-shi, Kanagawa (JP)

(72) Inventors: Jun Takahashi, Yokohama (JP); Takuji Teruuchi, Yokohama (JP)

(73) Assignee: JVCKENWOOD Corporation, Yokohama-shi (JP)

( * ) Notice: Subject to any disclaimer, the term of this patent is extended or adjusted under 35 U.S.C. 154(b) by 89 days.

(21) Appl. No.: 16/130,572

(22) Filed: Sep. 13, 2018

(65) Prior Publication Data
US 2019/0079108 A1    Mar. 14, 2019

(30) Foreign Application Priority Data
Sep. 13, 2017   (JP) .................. 2017-175484

(51) Int. Cl.
*H04N 7/18* (2006.01)
*G01P 1/12* (2006.01)
(Continued)

(52) U.S. Cl.
CPC ............. *G01P 1/12* (2013.01); *B60R 1/10* (2013.01); *B60R 1/12* (2013.01); *G01P 1/127* (2013.01); *G01P 15/0891* (2013.01); *H04N 5/2251* (2013.01); *H04N 5/772* (2013.01); *H04N 7/18* (2013.01); *H04N 7/188* (2013.01)

(58) Field of Classification Search
CPC ........... G06K 9/00798; G06K 9/00805; G06K 9/6202; G06K 9/3233; G06K 9/4609; G06K 9/6205; G06K 9/66; G06T 7/74; B60W 2420/42; B60R 1/10; B60R 1/12; G01P 1/12; G01P 1/127; G01P 15/0891; G07C 5/0841; H04N 5/2251; H04N 5/772; H04N 7/18; H04N 7/188
See application file for complete search history.

(56) References Cited

U.S. PATENT DOCUMENTS

2002/0005895 A1 *   1/2002   Freeman ................ H04N 5/772
                                                                348/143
2007/0027583 A1 *   2/2007   Tamir ..................... G08G 1/164
                                                                701/1
(Continued)

FOREIGN PATENT DOCUMENTS

JP          2000006854 A       1/2000

*Primary Examiner* — Peet Dhillon
(74) *Attorney, Agent, or Firm* — Procopio, Cory, Hargreaves & Savitch LLP

(57) ABSTRACT

A driving recorder includes: an image data acquisition unit; an extraction unit; a determination unit; and a writing controller. The writing controller configured to write, when the determination unit has determined that a change in the other vehicle does not coincide with a predetermined reference change, the image data into a memory by a ring buffer form, and write, when the determination unit has determined that the change coincides with the predetermined reference change, the image data for a predetermined period of time including the plurality of pieces of image data regarding which the determination has been made in such a way that the image data is not overwritten by other data.

6 Claims, 7 Drawing Sheets

(51) Int. Cl.
*B60R 1/10* (2006.01)
*H04N 5/225* (2006.01)
*B60R 1/12* (2006.01)
*G01P 15/08* (2006.01)
*H04N 5/77* (2006.01)

(56) References Cited

U.S. PATENT DOCUMENTS

2014/0229207 A1* 8/2014 Swamy ................ G06K 9/4604
 705/4
2018/0150701 A1* 5/2018 Kang ..................... G06K 9/78

* cited by examiner

ON-VEHICLE IMAGE RECORDING APPARATUS, ON-VEHICLE IMAGE RECORDING METHOD, AND ON-VEHICLE IMAGE RECORDING PROGRAM

CROSS REFERENCE TO RELATED APPLICATION

This application is based upon and claims the benefit of priority from Japanese patent application No. 2017-175484, filed on Sep. 13, 2017, the disclosure of which is incorporated herein in its entirety by reference.

BACKGROUND

The present disclosure relates to an on-vehicle image recording apparatus, an on-vehicle image recording method, and an on-vehicle image recording program.

In recent years, use of driving recorders has become more and more widespread. The driving recorder moves, when it has detected an event such as an impact in an own vehicle, image data for a predetermined period of time including the timing when the event has been detected to a memory area in which the stored data is not overwritten by other data (see, for example, Japanese Unexamined Patent Application Publication No. 2000-6854).

SUMMARY

While a conventional driving recorder is advantageous in that it records an event such as an accident that has occurred in an own vehicle, it has a disadvantage when it comes to recording an event that has occurred in another vehicle observed from the own vehicle. That is, while the conventional driving recorder is able to recognize the event that has occurred in the own vehicle by an impact detected by a sensor, it is not able to detect the event that has occurred in the other vehicle. Therefore, even when the event that has occurred in the other vehicle has been captured, this moving image data is overwritten by other data and deleted as time goes by. While it is possible to move the moving image file at the timing of the event to a memory area in which the stored data is not overwritten by other data by operating a button or the like, it is difficult for a driver during the driving to operate the button at an appropriate timing. Further, it is difficult also for an occupant seated in a front passenger seat to operate the driving recorder installed on the back side of the rearview mirror.

An on-vehicle image recording apparatus according to a first aspect of the present disclosure includes: an image data acquisition unit configured to sequentially acquire a plurality of pieces of image data obtained by capturing images of surroundings of an own vehicle; an extraction unit configured to extract an image area of another vehicle from an image of the image data; a determination unit configured to determine whether a change in the other vehicle in the image area extracted by the extraction unit from each of the plurality of pieces of image data successively acquired by the image data acquisition unit coincides with a predetermined reference change; and a writing controller configured to write, when the determination unit has determined that the change does not coincide with the predetermined reference change, the image data into a memory by a ring buffer form, and write, when the determination unit has determined that the change coincides with the predetermined reference change, the image data for a predetermined period of time including the plurality of pieces of image data regarding which the determination has been made in such a way that the image data is not overwritten by other data.

An on-vehicle image recording method according to a second aspect of the present disclosure includes: an image data acquisition step for sequentially acquiring a plurality of pieces of image data obtained by capturing images of surroundings of an own vehicle; an extraction step for extracting an image area of another vehicle from an image of the image data; a determination step for determining whether a change in the other vehicle in the image area extracted in the extraction step from each of the plurality of pieces of image data successively acquired in the image data acquisition step coincides with a predetermined reference change; and a writing control step for writing, when it is determined in the determination step that the change does not coincide with the predetermined reference change, the image data into a memory by a ring buffer form, and write, when it is determined in the determination step that the change coincides with the predetermined reference change, the image data for a predetermined period of time including the plurality of pieces of image data regarding which the determination has been made in such a way that the image data is not overwritten by other data.

An on-vehicle image recording program stored in a storage medium according to a third aspect of the present disclosure causes a computer to execute the following steps of: an image data acquisition step for sequentially acquiring a plurality of pieces of image data obtained by capturing images of surroundings of an own vehicle; an extraction step for extracting an image area of another vehicle from an image of the image data; a determination step for determining whether a change in the other vehicle in the image area extracted in the extraction step from each of the plurality of pieces of image data successively acquired in the image data acquisition step coincides with a predetermined reference change; and a writing control step for writing, when it is determined in the determination step that the change does not coincide with the predetermined reference change, the image data into a memory by a ring buffer form, and write, when it is determined in the determination step that the change coincides with the predetermined reference change, the image data for a predetermined period of time including the plurality of pieces of image data regarding which the determination has been made in such a way that the image data is not overwritten by other data.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
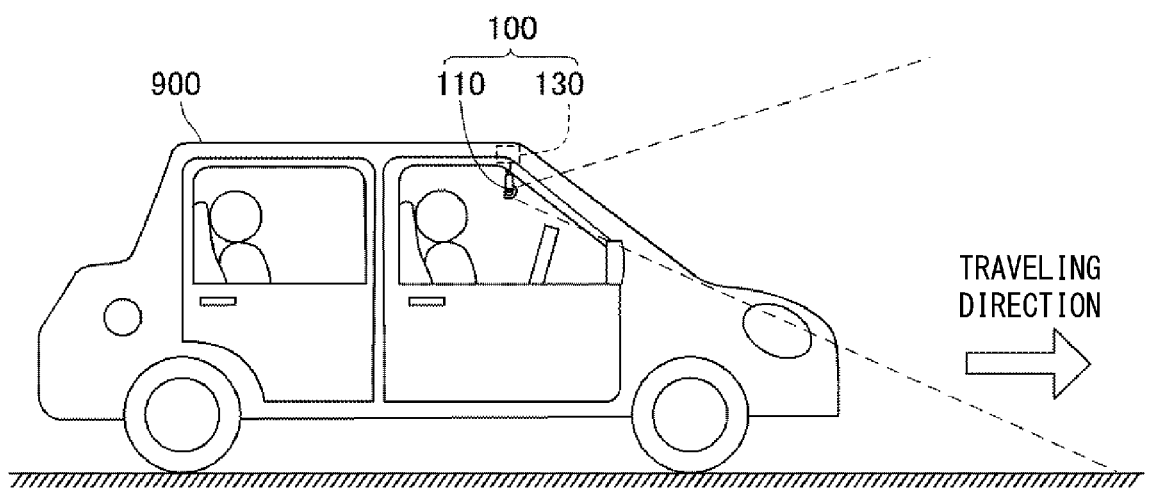
FIG. 1 is a schematic view showing a state in which a driving recorder is installed in an own vehicle.

FIG. 1 is a schematic view showing a state in which a driving recorder 100, which is one example of an on-vehicle image recording apparatus according to this embodiment, is installed in an own vehicle 900. The driving recorder 100 includes a camera unit 110 and a main body unit 130. The camera unit 110 is installed in the upper part of a windshield toward the traveling direction of the own vehicle 900 in such a way that it can capture images of a surrounding environment in the front of the vehicle. The field of view of the camera unit 110 has an extent of an opposite angle of about 130°, as shown by the dotted line.

The main body unit 130 functions as a control apparatus that processes and records images captured by the camera unit 110. The main body unit 130 may be integrally formed with the camera unit 110 or may be formed as a separate unit connected to the camera unit 110. When the main body unit 130 is formed as a unit separated from the camera unit 110, the main body unit 130 may be, for example, embedded in a navigation device and integrally formed with the navigation device.

Figure 2:
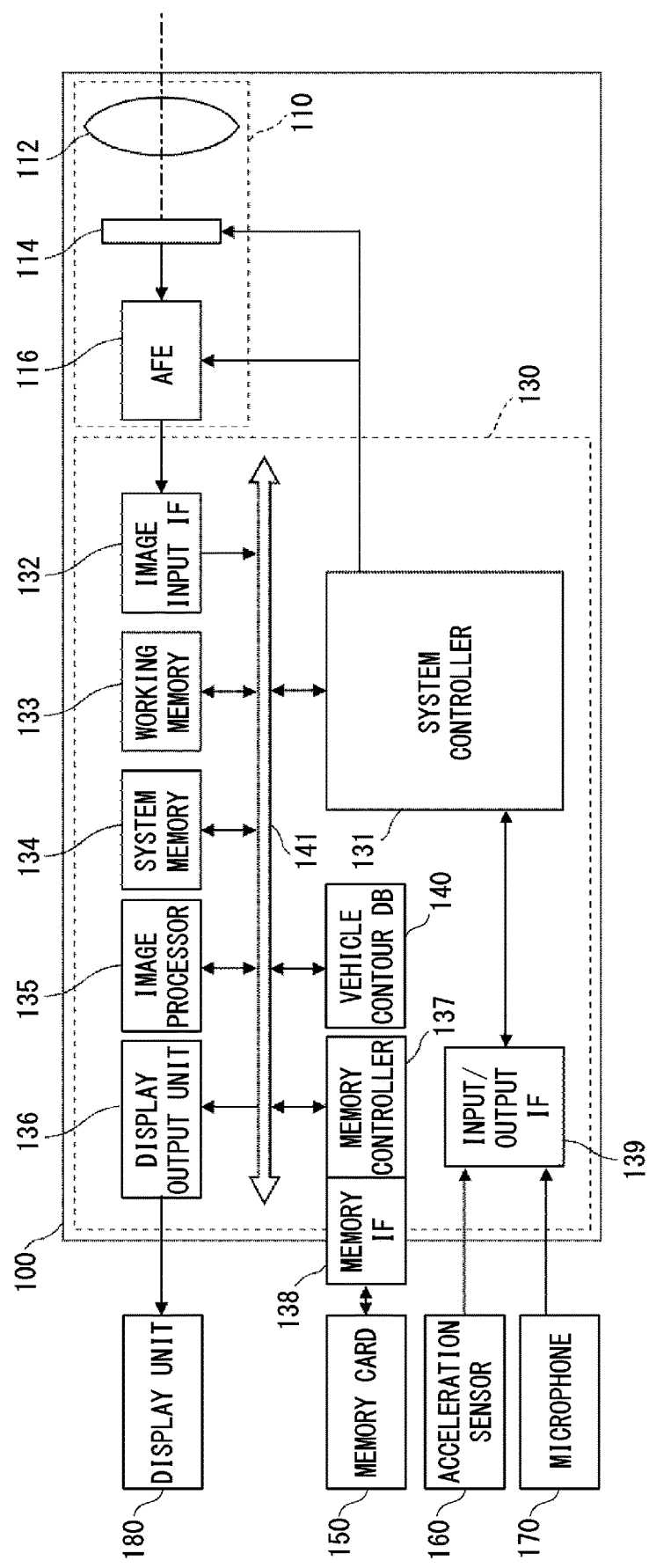
FIG. 2 is a block diagram showing a structure of the driving recorder.

FIG. 2 is a block diagram showing a structure of the driving recorder 100. As described above, the driving recorder 100 is mainly composed of the camera unit 110 and the main body unit 130. The camera unit 110 mainly includes a lens 112, an image-pickup device 114, and an analog front end (AFE) 116. The lens 112 guides a subject light flux that is incident thereon to the image-pickup device 114. The lens 112 may be composed of a plurality of optical lens groups.

The image-pickup device 114 is, for example, a CMOS image sensor. The image-pickup device 114 adjusts a charge accumulation time by an electronic shutter in accordance with the exposure time per one frame that is specified by a system controller 131, conducts a photoelectric conversion, and outputs a pixel signal. The image-pickup device 114 passes the pixel signal to the AFE 116. The AFE 116 adjusts the level of the pixel signal in accordance with an amplification gain instructed by the system controller 131, A/D converts this pixel signal into digital data, and transmits the resulting signal to the main body unit 130 as pixel data. The camera unit 110 may be provided with a mechanical shutter and an iris diaphragm. When the mechanical shutter and the iris diaphragm are included, the system controller 131 is able to use them to adjust the amount of light to be made incident on the image-pickup device 114.

The main body unit 130 mainly includes the system controller 131, an image input IF 132, a working memory 133, a system memory 134, an image processor 135, a display output unit 136, a memory controller 137, a memory IF 138, an input/output IF 139, a vehicle contour DB 140, and a bus line 141. The main body unit 130 is connected to the camera unit 110 via a wire or wirelessly. The image input IF 132 sequentially acquires image signals output from the camera unit 110 and passes these image signals to the bus line 141.

The working memory 133 is composed of, for example, a volatile high-speed memory. The working memory 133 receives the image signals from the AFE 116 via the image input IF 132, compiles the received image signals into image data of one frame, and then stores the compiled image data. The working memory 133 passes the image data to the image processor 135 in a unit of frames. Further, the working memory 133 is used as appropriate as a temporary storage area even in the middle of image processing performed by the image processor 135.

The image processor 135 executes various kinds of image processing on the received image data and generates image data in accordance with a predetermined format. When, for example, moving image data in a form of an MPEG file is generated, the image data of each frame is subjected to white balance processing, gamma processing and the like, and then the image data of each frame or a plurality of pieces of image data of frames adjacent to each other are subjected to compression processing.

Since the driving recorder 100 according to this embodiment includes the camera unit 110, the camera unit 110, the image input IF 132, the working memory 133, the image processor 135, and the system controller 131 function as an image data acquisition unit that acquires image data in collaboration with one another. The driving recorder 100 may use a camera unit as an external device such as a camera unit of an automatic driving support device. In this case, besides the image input IF 132 that receives the image signals from the camera unit, the working memory 133, the image processor 135, and the system controller 131 that collaborate with one another for the image acquisition and image generation serve as an image data acquisition unit that acquires the image data. Alternatively, the driving recorder 100 may acquire the image data generated by the camera unit used as an external device. In this case, the input IF that receives this image data functions as an image data acquisition unit.

The image processor 135 sequentially generates image data to be displayed from the image data that has been generated, and passes the generated image data to the display output unit 136. The display output unit 136 converts the image data to be displayed received from the image processor 135 into an image signal that can be displayed on a display unit 180 and outputs the image signal. The display unit 180 may be, for example, a display panel of a navigation device or may be a dedicated display panel integrally provided with the driving recorder 100. The display unit 180 is able to sequentially display the image signals received from the display output unit 136.

The system memory 134 is composed of, for example, a non-volatile storage medium such as an SSD. The system memory 134 stores and holds constant numbers, variable numbers, set values, control programs and the like required for the operation of the driving recorder 100.

The memory IF 138 is a connection interface on which a removable memory card 150 is mounted. The memory card 150 is a non-volatile memory (e.g., a flash memory). The memory controller 137 executes a memory control to write the image data into the memory card 150 mounted on the memory IF 138. The image data that has been generated is subjected to writing processing by the memory controller 137, and then recorded in a memory area of the memory card 150. That is, the memory controller 137 functions as a writing controller that writes the image data into the memory card 150. The specific memory control will be explained later.

The input/output IF 139, which is a connection interface with an external device, receives a signal from the external device to pass the received signal to the system controller 131, and receives a control signal such as a signal request for the external device from the system controller 131, and transmits the control signal to the external device. An acceleration signal from an acceleration sensor 160 and a voice signal from a microphone 170 are input to the system controller 131 via the input/output IF 139.

The acceleration sensor 160 is a sensor that detects the acceleration of an impact and the like that the own vehicle 900 receives. The system controller 131 acquires the acceleration signal acquired from the acceleration sensor 160 via the input/output IF 139. When the magnitude of this acceleration signal is equal to or larger than a predetermined threshold, the system controller 131 determines that an event such as a collision has occurred. Accordingly, the system controller 131 functions as an event signal acquisition unit. The acceleration sensor 160 may be embedded in the driving recorder 100.

The microphone 170 is a device for inputting an environmental sound in the vicinity of the own vehicle 900. The system controller 131 acquires an environmental sound signal that has been acquired from the microphone 170 via the input/output IF 139. When the magnitude of this environmental sound signal is equal to or larger than a predetermined threshold, when the environmental sound is a sudden environmental sound whose magnitude is equal to or larger than a predetermined threshold, or when the environmental sound is close to the sound of a collision of automobiles or the like stored in advance, the system controller 131 determines that an impact sound in accordance with an impact such as a collision has occurred. Therefore, the system controller 131 functions as an impact sound signal acquisition unit. The microphone 170 may be embedded in the driving recorder 100.

The vehicle contour DB 140 is an image database that stores contour information obtained when various vehicles are observed from various angles. The image processor 135 refers to the contour information stored in the vehicle contour DB 140 and constantly analyzes, by matching processing, whether there is an area that coincides with the contour information in the image that has been acquired from the camera unit 110. The image processor 135 extracts the contour of another vehicle as the result of the analysis. The vehicle contour DB 140 may be provided in a cloud space or may be included in a navigation device or a driving support system.

The system controller 131 is, for example, a CPU, and directly or indirectly controls each of the components that compose the driving recorder 100. The control by the system controller 131 is achieved by a control program or the like loaded from the system memory 134.

While a conventional driving recorder is advantageous in that it records an event such as an accident that has occurred in an own vehicle, it has a disadvantage when it comes to recording an event that has occurred in another vehicle observed from the own vehicle. That is, while the conventional driving recorder is able to recognize the event that has occurred in the own vehicle by an impact detected by a sensor, it is not able to detect the event that has occurred in the other vehicle. Therefore, even when the event that has occurred in the other vehicle has been captured, this moving image data is overwritten by other data and deleted as time goes by. While it is possible to move the moving image file at the timing of the event to a memory area in which the stored data is not overwritten by other data by operating a button or the like, it is difficult for a driver during the driving to operate the button. Further, it is difficult also for an occupant seated in a front passenger seat to operate the driving recorder installed on the back side of the rearview mirror.

The driving recorder 100 according to this embodiment detects the event that occurred in the other vehicle and writes the image data including the image of this event in the memory card 150 in such a way that the image data is not overwritten by other data. Specifically, the system controller 131 causes the image processor 135 to extract the image area of the other vehicle from the image of the image data that has been acquired. As described above, the image processor 135 defines the contour of the other vehicle using the contour information of the vehicle contour DB 140 and extracts the image area in such a way as to surround this contour. The system controller 131 determines whether a change in the other vehicle in the image area extracted from each of the pieces of image data successively acquired coincides with a predetermined reference change. When it is determined that this change coincides with the reference change, the system controller 131 writes the image data for a predetermined period of time including the image data from which the determination has been made in the memory card 150 in such a way that this data is not overwritten by other data.

Figure 3A:
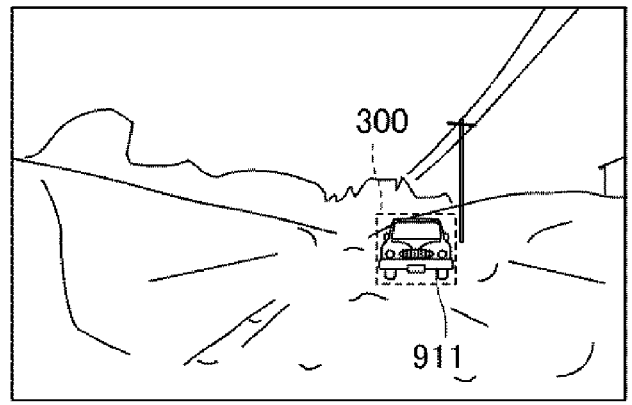
FIG. 3A is a diagram for explaining a first reference change of another vehicle and shows a state before the first reference change occurs.
Figure 3B:
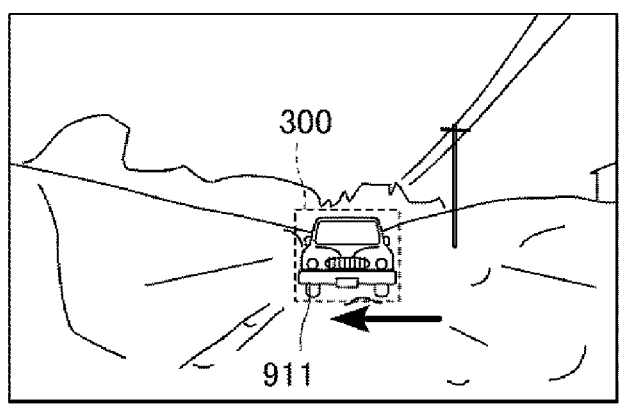
FIG. 3B is a diagram for explaining the first reference change of the other vehicle and shows a state in which the first reference change is occurring.

Specific examples will be explained. FIGS. 3A and 3B are diagrams for explaining a first reference change that has occurred in an image area that has captured another vehicle 911. The first reference change is a change in which the other vehicle 911 moves without changing the orientation of the vehicle so as to have a component oriented in the direction orthogonal to the direction in which the other vehicle 911 was traveling before the change. This first reference change is a change of a so-called skid. When the other vehicle 911 moves so as to have a component oriented in the direction orthogonal to the traveling direction while changing the orientation of the vehicle, this movement is determined to be a normal turning movement which does not correspond to the first reference change. The scene illustrated in FIGS. 3A and 3B is a scene in which the traveling path is covered with snow, and shows a state in which the other vehicle 911 is approaching the own vehicle 900 in the opposite lane. The rectangle that surrounds the scene is the area captured by the image-pickup device 114, and the image processor 135 sequentially processes the images in this area.

FIG. 3A shows a state before the first reference change occurs. Specifically, FIG. 3A shows a state in which the image processor 135 captures the contour of the other vehicle 911 in accordance with an instruction from the system controller 131, sets a recognition frame 300 in such a way as to surround the other vehicle 911, and tracks the other vehicle 911. In this case, the system controller 131 and the image processor 135 each function as an extraction unit that extracts the image area of the other vehicle 911.

FIG. 3B shows a state in which the first reference change is occurring. Specifically, FIG. 3B shows a state in which the other vehicle 911 slides to the lane (in the arrow direction) in which the own vehicle 900 is traveling without changing the direction of the vehicle body while continuing traveling in the traveling direction. The system controller 131 determines that this change coincides with the first reference change. That is, the system controller 131 serves as a determination unit that determines whether the change in the image area extracted from each of the plurality of pieces of image data that have been successively acquired coincides with the predetermined first reference change in collaboration with the image processor 135.

More specifically, the system controller 131 determines, when the vehicle contour in the recognition frame 300 in one frame and that in the next frame coincide with each other within a prescribed error range and the motion vector of the recognition frame includes the component spatially orthogonal to the motion vector before the change, that the change coincides with the first reference change. In this case, the change may include a change in the size of the recognition frame 300; that is, an increase or a decrease in the size of the recognition frame 300. In order to exclude the change due to the normal driving such as a lane change by a steering wheel operation, an additional threshold may be set. For example, a threshold may be set for the moving speed in the orthogonal direction with respect to the traveling speed before the change or a rate of the change in the orthogonal direction with respect to the change in the traveling direction, and it can be determined that the first reference change has occurred when they have exceeded the thresholds. When they do not exceed the thresholds, even when the change in the contour of the other vehicle cannot be accurately captured, it can be determined that this change corresponds to a turning movement or the like by normal driving.

When the first reference change has occurred in the image area that captures the other vehicle 911, the system controller 131 determines that an event has occurred in the other vehicle 911. This first reference change may occur not only in the case in which the oncoming vehicle skids on a snowy road but also in various other situations. These situations include, for example, a case in which the other vehicle that has crossed in the front of the own vehicle 900, which is stopped at an intersection, is hit by a vehicle coming from the opposite lane from a side direction and the other vehicle moves in the orthogonal direction. There is also a case in which the other vehicle 911 is pressed from the side direction due to an avalanche or landslide. The driving recorder 100 according to this embodiment is able to record the image data that has captured these situations in such a way that this data is not overwritten by other data.

Figure 4A:
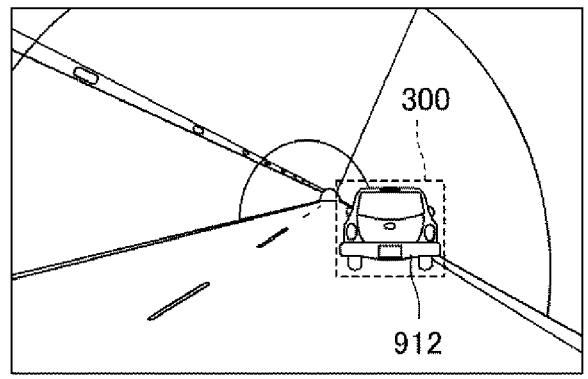
FIG. 4A is a diagram for explaining a second reference change of another vehicle and shows a state before the second reference change occurs.
Figure 4B:
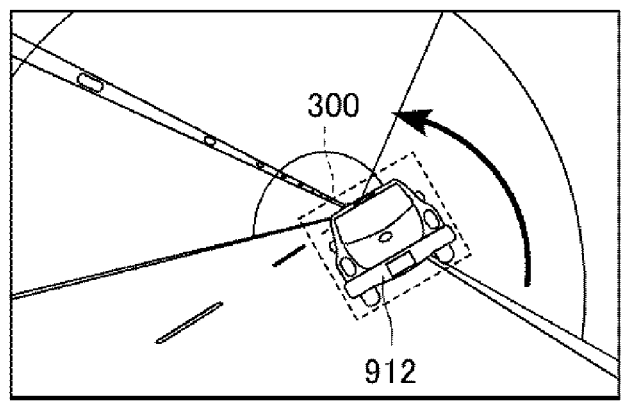
FIG. 4B is a diagram for explaining the second reference change of the other vehicle and shows a state in which the second reference change is occurring.

FIGS. 4A and 4B are diagrams for explaining a second reference change that has occurred in the image area that has captured another vehicle 912. The second reference change is a change in which the other vehicle 912 is rotated around the rotation axis parallel to the direction in which the other vehicle 912 was traveling before the change. The scene shown in FIGS. 4A and 4B, which is the scene in a tunnel, shows a state in which the other vehicle 912 is traveling in the front of the own vehicle 900 in one lane. The rectangle that surrounds the scene is the area captured by the image-pickup device 114, and the image processor 135 sequentially processes the images in this area.

FIG. 4A shows a state before the second reference change occurs. Specifically, FIG. 4A shows a state in which the image processor 135 captures the contour of the other vehicle 912 in accordance with an instruction from the system controller 131, sets the recognition frame 300 in such a way as to surround the other vehicle 912, and tracks the other vehicle 912.

FIG. 4B shows a state in which the second reference change is occurring. Specifically, FIG. 4B shows a state in which the other vehicle 911 collides with the side wall of the tunnel and overturns toward the adjacent lane after a rebound. The system controller 131 determines that this change coincides with the second reference change. That is, the system controller 131 serves as a determination unit that determines whether the change in the image area extracted from each of the plurality of pieces of image data that have been successively acquired coincides with the predetermined second reference change in collaboration with the image processor 135.

More specifically, the system controller 131 determines, when the vehicle contour in the recognition frame 300 in one frame and that in the next frame coincide with each other within a prescribed error range and these vehicle contours are in a relation in which they are rotated with each other around a virtual point on the image, that the change coincides with the second reference change. In this case, the change may include a change in the size of the recognition frame 300; that is, an increase or a decrease in the size of the recognition frame 300. When this change is recognized, it is determined that this virtual point is on the rotation axis parallel to the direction in which the other vehicle was traveling before the change and the other vehicle 912 has rotated around the rotation axis. The virtual point may move with time. An additional threshold may be set in order to exclude a change due to a bank on a road surface or the like. A threshold may be set, for example, for the turning angle velocity. When the turning angle velocity exceeds the threshold, it may be determined that the second reference change has occurred.

When the second reference change has occurred in the image area that captures the other vehicle 912, the system controller 131 determines that an event has occurred in the other vehicle 912. This second reference change may occur not only in the case in which the preceding vehicle is rotated but also in various other situations. The driving recorder 100 according to this embodiment is able to record the image data that has captured these situations in such a way that this data is not overwritten by other data.

Figure 5A:
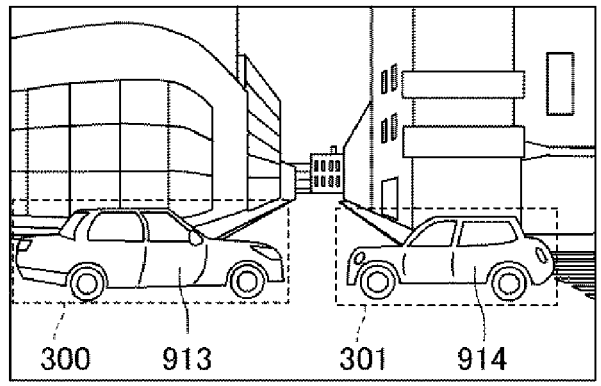
FIG. 5A is a diagram for explaining a third reference change of another vehicle and shows a state before the third reference change occurs.
Figure 5B:
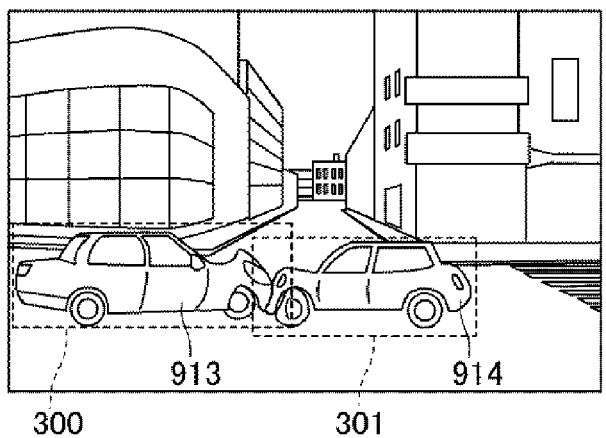
FIG. 5B is a diagram for explaining the third reference change of the other vehicle and shows a state in which the third reference change is occurring.

FIGS. 5A and 5B are diagrams explaining a third reference change that has occurred in an image area that captures another vehicle 913. The third reference change is a change in which a part of the contour of the other vehicle 913 is deformed. FIGS. 5A and 5B show the scene at an intersection in a town and shows a state in which, while the own vehicle 900 stops in front of the intersection, other vehicles 913 and 914 come close to each other on the road that crosses in the front of the own vehicle 900. The rectangle that surrounds the scene is the area captured by the image-pickup device 114, and the image processor 135 sequentially processes the images in this area.

FIG. 5A shows a state before the third reference change occurs. Specifically, FIG. 5A shows a state in which the image processor 135 captures the contours of the other vehicles 913 and 914 in accordance with an instruction by the system controller 131, sets recognition frames 300 and 301 in such a way as to surround the other vehicles 913 and 914, and tracks the other vehicles 913 and 914.

FIG. 5B shows a state in which the third reference change is occurring. Specifically, FIG. 5B shows a state in which the other vehicle 913 collides with the other vehicle 914 and a part of the other vehicle 913 near the hood is deformed. A part of the other vehicle 914 near the hood is also deformed. The system controller 131 captures the change in the recognition frame 300 and determines that this change corresponds to the third reference change. That is, the system controller 131 serves as a determination unit that determines whether the change in the image area extracted from each of the plurality of pieces of image data that have been successively acquired corresponds to the predetermined third reference change in collaboration with the image processor 135.

More specifically, the system controller 131 determines, when a vehicle contour in the recognition frame 300 in a certain frame no longer partially coincides with the vehicle contours in the recognition frame 300 in a certain number of consecutive frames, that this change coincides with the third reference change. In this case, a change in which the size of the recognition frame 300 is increased or decreased may occur. When this change is recognized, it is determined that the other vehicle 913 has been deformed due to a collision. In order to exclude a change in the vehicle contour in accordance with a turn or the like, the recognition frame may be divided into a plurality of areas, and an additional condition such as the condition that the amount of change in the contour is equal to or smaller than a threshold in one or more areas thereof may be set. As long as a plurality of other vehicles can be detected independently from one another, when a deformation is recognized in at least one recognition frame, it can be determined that the third reference change has occurred. In the example shown in FIG. 5, for example, the recognition frame 301 of the other vehicle 914 may be set to the target for the determination.

When the third reference change has occurred in the image area that captures the other vehicles 913 and 914, the system controller 131 determines that an event has occurred in the other vehicles 913 and 914. The third reference change may occur not only in the case in which the vehicles collide with each other but also in various other situations. The driving recorder 100 according to this embodiment is able to record the image data that has captured these situations in such a way that this data is not overwritten by other data.

Besides the reference changes described with reference to the specific scenes in FIGS. 3A to 5B, various other reference changes may be set in advance. For example, a change in which the contour of the other vehicle is enlarged or reduced by more than a predetermined percentage within a predetermined period of time may be set as an independent reference change. The other vehicle that causes this change is the other vehicle that comes close to or moves away from the own vehicle 900 relatively at a high speed. In this case, it is highly likely that an event has occurred in the other vehicle.

Besides the condition that the change in the image area in the recognition frame coincides with the reference change, another condition may be set. In this case, when, besides the former condition, the other condition is satisfied, it may be determined that the event has occurred in the other vehicle and the image data may be recorded in such a way that it is not overwritten by other data. It may be presumed that there is a collision sound when the event has occurred, and the occurrence of the impact sound in the surrounding environment may be set as an additional condition for the occurrence of the event. In this case, when the system controller 131 does not acquire an impact sound signal via the microphone 170, even when the change in the image area in the recognition frame satisfies the reference change, the memory controller 137 writes the image data that has been generated into a ring buffer 152 as the normal image data.

Figure 6A:
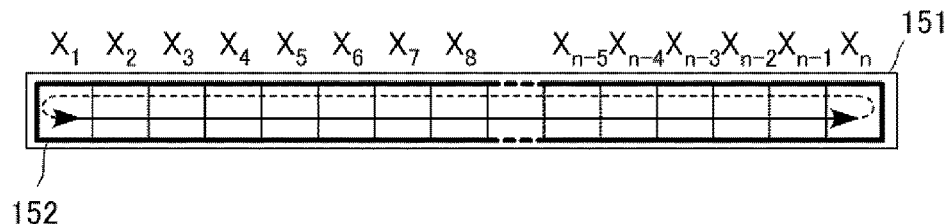
FIG. 6A is a diagram showing a memory area of a memory card and is a conceptual diagram showing when the overall memory area is used as a ring buffer.
Figure 6B:
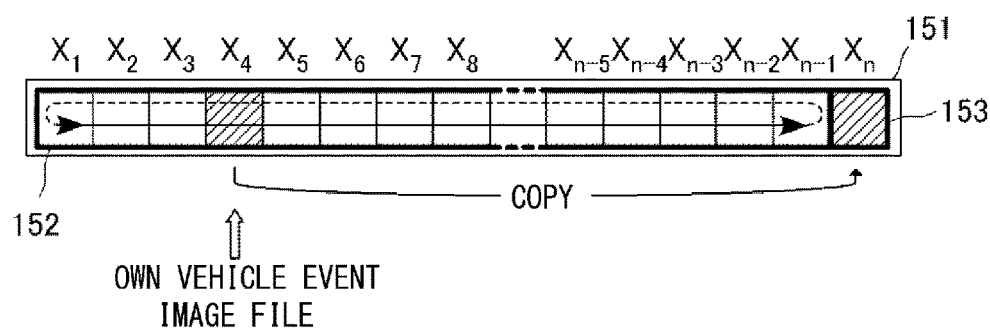
FIG. 6B is a diagram showing the memory area of the memory card and is a conceptual diagram for explaining the concept of a writing control when an event has occurred in the own vehicle.
Figure 6C:
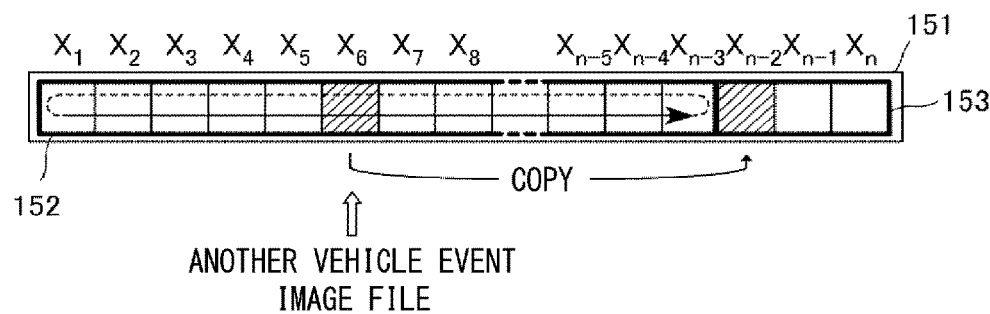
FIG. 6C is a diagram showing the memory area of the memory card and is a conceptual diagram for explaining the concept of a writing control of another vehicle event image file.

Next, the writing control of the image data in the memory area will be explained. FIGS. 6A to 6C are diagrams each showing the memory area of the memory card 150. The image processor 135 of the driving recorder 100 processes the images sequentially captured by the camera unit 110 and thus generates the moving image file at constant time intervals (e.g., one minute). Then the memory controller 138 sequentially records the moving image files generated in the image processor 135 in the memory card 150 via the memory IF 138. The moving image file is one aspect of the image data generated in the image processor 135.

Since there is a limitation in the memory capacity of the memory card 150, there is also a limitation in the number of moving image files that can be recorded therein. Since the driving recorder 100 continues to generate the moving image files during the period in which the own vehicle 900 keeps traveling, the driving recorder 100 can no longer record the latest moving image file that has been generated in the memory card 150 after a predetermined period of time. In order to address this problem, when the capacity of the memory card 150 reaches the upper limit of the memory capacity in the normal state in which no event occurs, the memory controller 138 continues recording processing by a ring buffer form in which the latest moving image file is overwritten in the storage area that stores the oldest moving image file.

FIG. 6A is a conceptual diagram showing when an overall memory area 151 of the memory card 150 is used as the ring buffer 152. When each memory area that can store one moving image file is represented by $X_1, X_2, \ldots,$ and $X_n$, the memory controller 138 sequentially records, for example, the first moving image file in $X_1$ and the next moving image file in $X_2$. When the n-th moving image file is recorded in $X_n$, the (n+1)-th moving image file is overwritten in $X_1$ in which the first moving image file was recorded. In a similar way, the (n+2)-th moving image file is overwritten in $X_2$. When the moving image files are recorded by the aforementioned ring buffer form, it is possible to hold the latest moving image files that correspond to the capacity of the ring buffer 152.

FIG. 6B is a conceptual diagram for explaining the concept of the writing control in a case in which an event has occurred in the own vehicle 900. The driving recorder 100 recognizes that the event has occurred when, for example, a large acceleration signal is received due to a collision by the other vehicle, and copies the moving image file that records this event to an area in which the overwriting is prohibited as an own vehicle event image file. When, for example, the moving image file recorded in the memory area $X_4$ that belongs to the ring buffer 152 includes the timing when the event has occurred in the own vehicle 900 in the image-pickup period, as shown in FIG. 6B, the memory area $X_n$ is changed to a non-volatile buffer 153 and this own vehicle event image file is copied to the non-volatile buffer 153.

The non-volatile buffer 153 is an area excluded from the storage area in which the image data is recorded in the ring buffer form, or in other words, an area in which the overwriting is prohibited. When an event occurs in the own vehicle 900 a plurality of times, $X_{n-1}, X_{n-2}, \ldots$ are changed to the non-volatile buffer 153 in this order every time the event occurs. That is, the area of the ring buffer 152 is reduced every time the area of the non-volatile buffer 153 is increased. The memory area of the non-volatile buffer 153 is used as the ring buffer 152 again when the memory card 150 is formatted or when the target moving image file is deleted by an instruction from the user. The capacity used as the non-volatile buffer 153 may be set in advance.

The driving recorder 100 according to this embodiment recognizes also an event that has occurred in the other vehicle and copies the moving image file including this event to the non-volatile buffer 153 as another vehicle event image file. FIG. 6C is a conceptual diagram for explaining the concept of the writing control of the other vehicle event image file. The method of increasing the area of the non-volatile buffer 153 and the method of moving the target moving image data are the same as those in the example described with reference to FIG. 6B.

It is assumed that the moving image file recorded in the memory area $X_6$ that belongs to the ring buffer 152 includes the timing when the event that has occurred in the other vehicle is recognized in the image-pickup period. The memory controller 138 copies the moving image file in $X_6$ to the non-volatile buffer 153 as the other vehicle event image file. When, for example, the memory areas of $X_n$ and $X_{n-1}$ have already been occupied by other event image files, the memory area of $X_{n-2}$ is changed to the non-volatile buffer 153 and the target other vehicle event image file is copied to this non-volatile buffer 153, as shown in FIG. 6C.

The area of the non-volatile buffer 153 is increased in accordance with the number of own vehicle event image files and other vehicle event image files to be copied. When the event image file in which one event is continuously recorded is composed of a plurality of moving image files, the memory controller 138 may cause the image processor 135 to re-edit these moving image files into one moving image file.

As described above, when not only the image data of the event that has occurred in the own vehicle but also the image data of the event that has occurred in the other vehicle are copied to the non-volatile buffer 153, these data are not deleted by overwriting, whereby these data may be used when the accident or the like is investigated later or may be used as objective evidence. Further, since even the event that has occurred in the other vehicle is automatically recognized and written in the memory as the other vehicle event image file, the seated occupant does not need to perform any special operation on the driving recorder 100.

In order to differentiate the own vehicle event image file from the other vehicle event image file included in the non-volatile buffer 153, different tag information to differentiate them may be added to these image files. An image reproducing apparatus or a file management apparatus is able to differentiate the files from each other by checking the tag information added to the moving image files.

Figure 7:
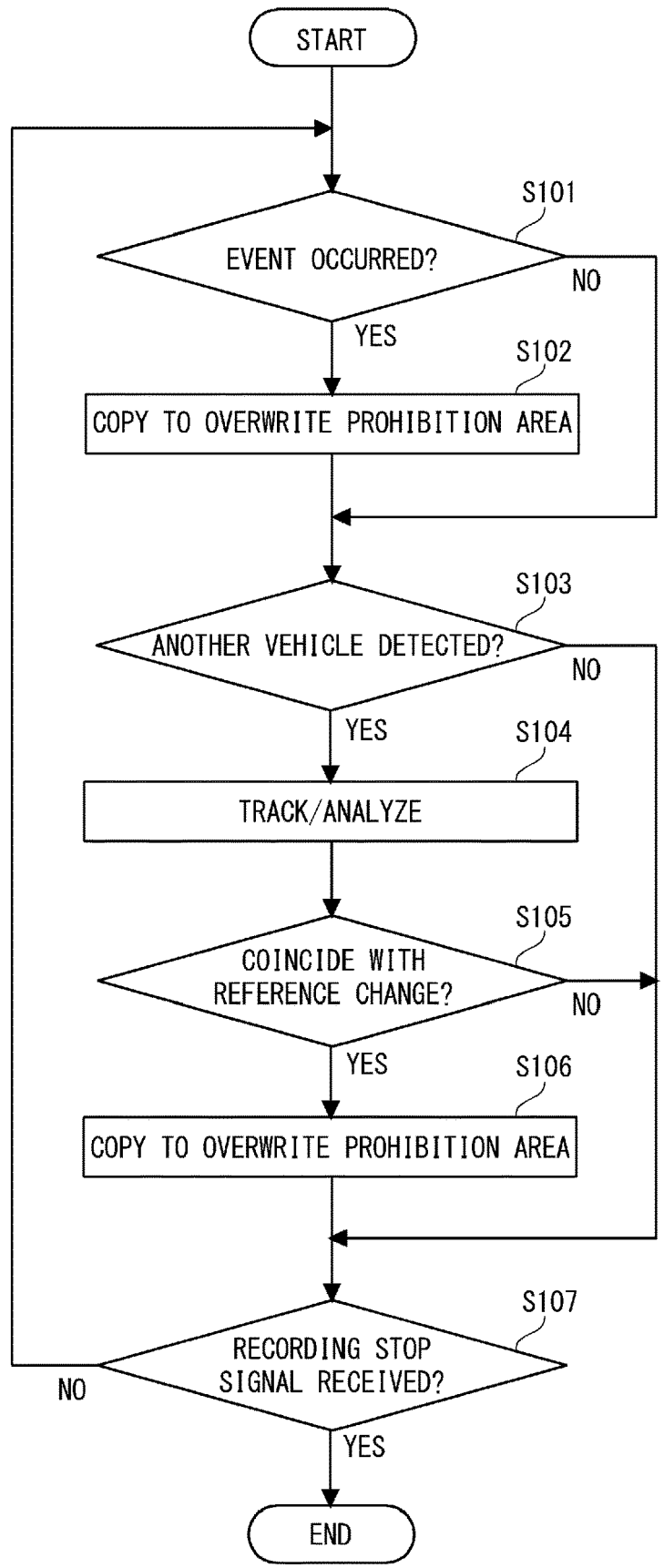
FIG. 7 is a flowchart showing a control flow of a driving recorder.

Next, a control flow of the driving recorder 100 will be explained. FIG. 7 is a flowchart showing a control flow of the driving recorder 100. The flow starts from the timing when a travel start preparation of the own vehicle 900 is completed. The travel start preparation of the own vehicle 900 is completed, for example, when an engine of the own vehicle 900 has started or the power of the own vehicle 900 has been turned on. Further, the driving recorder 100 may be always operated regardless of the state of the own vehicle. Further, the camera unit 110 starts capturing images at the same time when the flow starts, and the moving image files sequentially generated in the image processor 135 are recorded in the memory card 150 in series by the memory controller 137 in a ring buffer form.

The system controller 131 determines, in Step S101, whether it has received an acceleration signal whose magnitude is equal to or larger than the threshold from the acceleration sensor 160; that is, whether an event has occurred in the own vehicle 900. When it is determined that the system controller 131 has received the acceleration signal whose magnitude is equal to or larger than the threshold, it is recognized that an event has occurred in the own vehicle 900 and the process goes to Step S102. When it is determined that the system controller 131 has not received the acceleration signal whose magnitude is equal to or larger than the threshold, the process goes to Step S103. When the process goes to Step S102, the memory controller 137 copies the moving image files written into the ring buffer 152 to the non-volatile buffer 153 as the image files of the own vehicle event image, and then the process goes to Step S103.

The system controller 131 determines, in Step S103, whether the other vehicle has been detected in the image that has been acquired. When it is determined that the other vehicle has been detected, the process goes to Step S104. Otherwise, the process goes to Step S107. When the process goes to Step S104, as described above with reference to FIGS. 3A to 5B, the system controller 131 sets the recognition frame, tracks the other vehicle, and analyzes the change in the other vehicle from each of the pieces of image data successively acquired. Then the process goes to Step S105, where it is determined whether the result of the analysis coincides with a predetermined reference change. When it is determined that the result of the analysis coincides with the reference change, the process goes to Step S106. When it is determined that the result of the analysis does not coincide with the reference change, the process goes to Step S107. When the process goes to Step S106, the memory controller 137 copies a moving image file including the image that has coincided with the reference change to the non-volatile buffer 153 as the image file of the other vehicle event image. Then the process goes to Step S107.

In Step S107, the system controller 131 determines whether it has received a recording stop signal. The recording stop signal is, for example, a signal that is generated at the same time as the end of the traveling of the own vehicle 900, or a signal generated also from an operation of a start button by the user. When the system controller 131 determines that it has received the recording stop signal, it causes the camera unit 110 to stop the image pickup operation to end the processing series. When the system controller 131 determines that it has not received the recording stop signal, the process goes back to Step S101 to continue the processing series.

While one embodiment has been described above, the specific embodiment is not limited to the aforementioned one. When, for example, the own vehicle 900 is able to acquire the image data also from a camera unit that observes the side and the back of the own vehicle 900, it is possible to record a larger number of events that may occur in other vehicles traveling near the own vehicle 900. Further, the other vehicle that travels near the own vehicle 900 is not limited to a four-wheeled vehicle, and a two-wheeled vehicle may be the target for detecting an event.

Further, while the example in which the memory area 151 is divided into the contiguous ring buffer 152 and the contiguous non-volatile buffer 153 has been described in the embodiment described above, they may not be physically contiguous, as a matter of course. Further, while the form in which a part of the ring buffer 152 is changed to the non-volatile buffer 153 and the target moving image file is copied to the non-volatile buffer 153 has been described in the aforementioned embodiment, the writing control for prohibiting the overwriting is not limited to the aforementioned form. By setting a flag indicating that the overwriting in the memory area in which the target moving image file is recorded is prohibited, for example, this area may be treated as the non-volatile buffer 153. In this case, the processing of copying the moving image file can be omitted.

Further, while the example in which the memory area 151 of one memory card 150 is divided into the ring buffer 152 and the non-volatile buffer 153 has been explained in the aforementioned embodiment, each of the memory card 150 that is used as the ring buffer 152 and the memory card 150 that is used as the non-volatile buffer 153 may be mounted on the memory IF 138. Further, in place of the removable memory card 150, a memory mounted on the main body unit 130 may be used. Further, the memory IF 138 may be formed as a wireless IF, and the aforementioned writing control may be executed on the memory that is not physically adjacent thereto.

Further, while the moving image file of one minute corresponds to one unit of the writing control as an example in the aforementioned embodiment, one unit of the writing control is not limited to be one moving image file. The writing control may be performed, for example, in a unit of frames. Further, the target image data is not limited to be the moving image data and may be, for example, still image data obtained by interval photographing. When the writing control is performed in a unit of frames, for example, a file of a target period may be cut out of the moving image file of, for example, one minute that has already been generated to generate a new moving image file, and the new moving image file may be recorded in the non-volatile buffer. In this case, it is possible to leave the moving image file starting from the timing when the event has occurred.

Further, while the acceleration sensor 160 has been employed as the sensor that detects the occurrence of the event of the own vehicle in the aforementioned embodiment, another sensor may be used. The sensor may be, for example, a strain sensor that detects a deformation due to a collision of a target object or may be a temperature sensor that detects an abnormal temperature. As a matter of course, a plurality of sensors may be combined as appropriate.

Further, while the change in the other vehicle in the image area is monitored by referring to the vehicle contour DB 140 and extracting the contour of the other vehicle in the aforementioned embodiment, the change in the other vehicle may be determined not only from the contour information but also from other information. For example, color information on the other vehicle may be used or image information on the license plate that has been recognized may be used. The database may accumulate the vehicle information in accordance with the feature to be used.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An on-vehicle image recording apparatus comprising:
a system memory configured to store one or more programs; and
at least one hardware processor coupled to the memory and configured execute the one or more programs to:
sequentially acquire a plurality of pieces of image data obtained by capturing images of surroundings of an own vehicle;
extract an image area of another vehicle from an image of the image data;
determine whether a change in the other vehicle in the extracted image area from each of the sequentially acquired plurality of pieces of image data coincides with a reference change; and
write, when the change does not coincide with the reference change, the image data into a memory by a ring buffer form, and write, when the change coincides with the reference change, the image data for a period of time including the plurality of pieces of image data regarding which the determination has been made in such a way that the image data is not overwritten by other data,
wherein the reference change is a change in which the other vehicle moves without changing its orientation so as to have a component oriented in a direction orthogonal to a direction in which the other vehicle was traveling before the change, or
wherein the reference change is a change in which the other vehicle is rotated around a rotation axis parallel to a direction in which the other vehicle was traveling before the change.

2. The on-vehicle image recording apparatus according to claim 1, wherein the at least one processor is further configured to:
acquire an impact sound signal that detects an impact sound that occurs in the vicinity of the own vehicle, and
when the impact sound signal is not acquired, write the image data into the memory by the ring buffer form even if the change in the other vehicle coincides with the reference change.

3. The on-vehicle image recording apparatus according to claim 1, wherein the at least one processor is further configured to:
acquire an event signal that detects occurrence of a predetermined event in the own vehicle, and
when the event signal is acquired, write the acquired image data in a memory area that is the same as the memory area in which the image data is written when the change coincides with the reference change in such a way that the image data will not be overwritten by other data.

4. The on-vehicle image recording apparatus according to claim 3, wherein the at least one processor is further configured to add tag information to the image data written when the event signal is acquired the and tag information to the image data written when the change coincides with the reference change, the two pieces of tag information being different from each other.

5. An on-vehicle image recording method comprising:
   an image data acquisition step for sequentially acquiring a plurality of pieces of image data obtained by capturing images of surroundings of an own vehicle;
   an extraction step for extracting an image area of another vehicle from an image of the image data;
   a determination step for determining whether a change in the other vehicle in the image area extracted in the extraction step from each of the plurality of pieces of image data successively acquired in the image data acquisition step coincides with a reference change; and
   a writing control step for writing, when it is determined in the determination step that the change does not coincide with the reference change, the image data into a memory by a ring buffer form, and write, when it is determined in the determination step that the change coincides with the reference change, the image data for a period of time including the plurality of pieces of image data regarding which the determination has been made in such a way that the image data is not overwritten by other data,
   wherein the reference change is a change in which the other vehicle moves without changing its orientation so as to have a component oriented in a direction orthogonal to a direction in which the other vehicle was traveling before the change, or
   wherein the reference change is a change in which the other vehicle is rotated around a rotation axis parallel to a direction in which the other vehicle was traveling before the change.

6. A non-volatile storage medium storing an on-vehicle image recording program causing a computer to execute the following steps of:
   an image data acquisition step for sequentially acquiring a plurality of pieces of image data obtained by capturing images of surroundings of an own vehicle;
   an extraction step for extracting an image area of another vehicle from an image of the image data;
   a determination step for determining whether a change in the other vehicle in the image area extracted in the extraction step from each of the plurality of pieces of image data successively acquired in the image data acquisition step coincides with a reference change; and
   a writing control step for writing, when it is determined in the determination step that the change does not coincide with the reference change, the image data into a memory by a ring buffer form, and write, when it is determined in the determination step that the change coincides with the reference change, the image data for a period of time including the plurality of pieces of image data regarding which the determination has been made in such a way that the image data is not overwritten by other data,
   wherein the reference change is a change in which the other vehicle moves without changing its orientation so as to have a component oriented in a direction orthogonal to a direction in which the other vehicle was traveling before the change, or
   wherein the reference change is a change in which the other vehicle is rotated around a rotation axis parallel to a direction in which the other vehicle was traveling before the change.

* * * * *